E. P. LEHMANN.

TIE FOR PACKING BOXES.

APPLICATION FILED MAR. 11, 1909.

Reissued Apr. 13, 1909.

12,941.

2 SHEETS—SHEET 1.

Witnesses:
E. O. Hildebrand
M. F. Anderson

Inventor:
Ernst Paul Lehmann
by Georgii Massud
his attorney

THE NORRIS PETERS CO., WASHINGTON, D. C.

E. P. LEHMANN.

TIE FOR PACKING BOXES.

APPLICATION FILED MAR. 11, 1908.

Reissued Apr. 13, 1909.

12,941.

2 SHEETS—SHEET 2.

Witnesses:
E. D. Niedebrand
H. F. Anderson

Inventor
Ernst Paul Lehmann
by George W. Massie
his attorney

THE NORRIS PETERS CO., WASHINGTON, D. C.

UNITED STATES PATENT OFFICE.

ERNST PAUL LEHMANN, OF BRANDENBURG-ON-THE-HAVEL, GERMANY.

TIE FOR PACKING-BOXES.

No. 12,941. Specification of Reissued Letters Patent. Reissued April 13, 1909.

Original No. 910,551, dated January 26, 1909, Serial No. 204,112. Application for reissue filed March 11, 1909. Serial No. 482,872.

*To all whom it may concern:*

Be it known that I, ERNST PAUL LEHMANN, a subject of the King of Prussia, residing at No. 6 Plauerstrasse, Brandenburg-on-the-Havel, Kingdom of Prussia, German Empire, have invented certain new and useful Improvements in Ties for Packing-Boxes; and I do hereby declare the following to be a full, clear, and exact description of the invention, such as will enable others skilled in the art to which it appertains to make and use the same.

My invention relates to an improved tie for packing-boxes, and the object of my invention is to provide the box with a string or strings permanently secured to it in a manner that the said string or strings, traversing the cover of the box, hold the same tightly pressed upon the body of the box, when a strain is applied to the projecting free end or ends of the string or strings, but leave the said cover free to be lifted or removed from the box, when the strain is released and the string or strings are drawn slack, a handle secured to the projecting free end or ends of the string or strings serving at the same time to carry the box by hand, to apply the strain to the string or strings for tightening the tie, and also to secure the tie against being spontaneously loosened when the box is on stock or packed for transmission.

To make my invention fully understood, I have illustrated the same in the accompanying drawings, in which—

Figure 1:
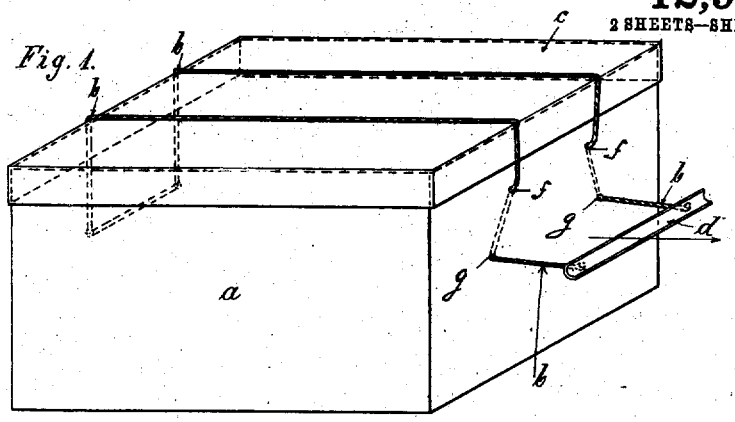
Figure 2:
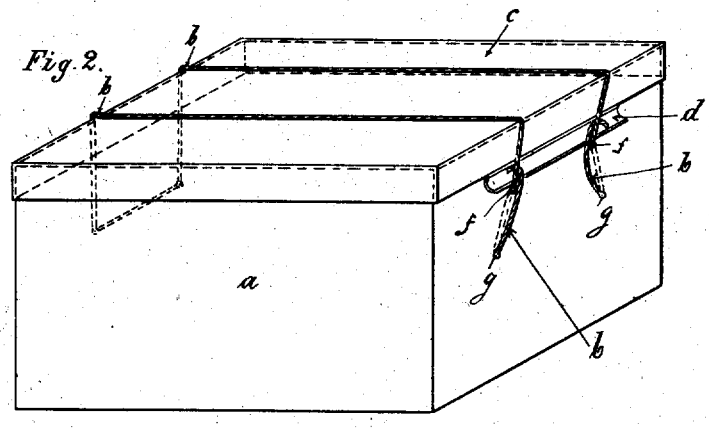
Figure 3:
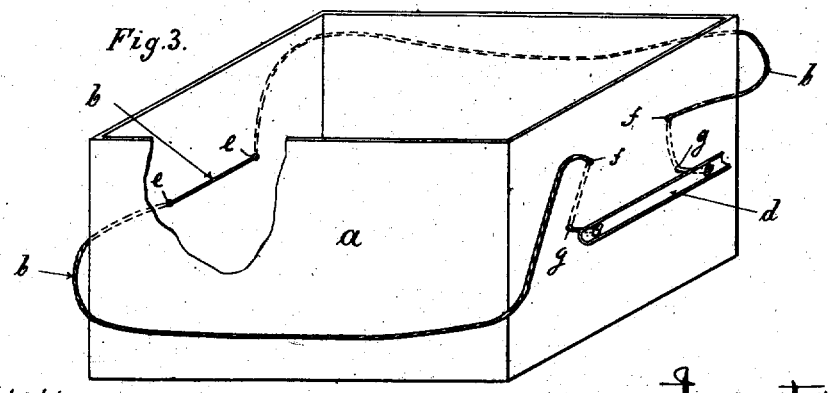
Figure 4:
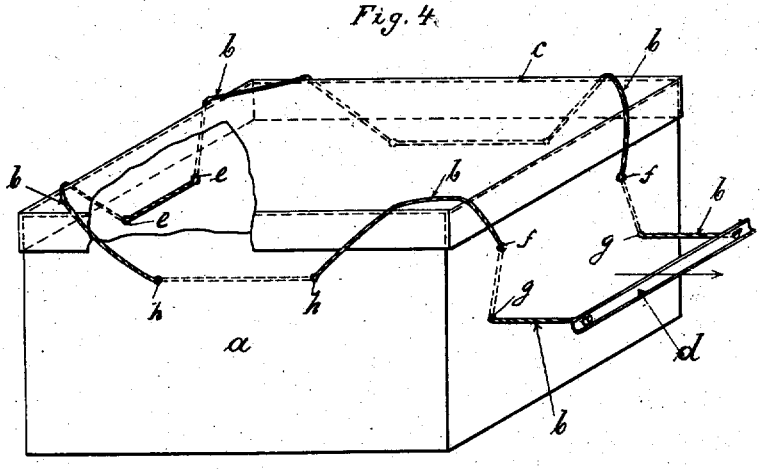
Figure 5:
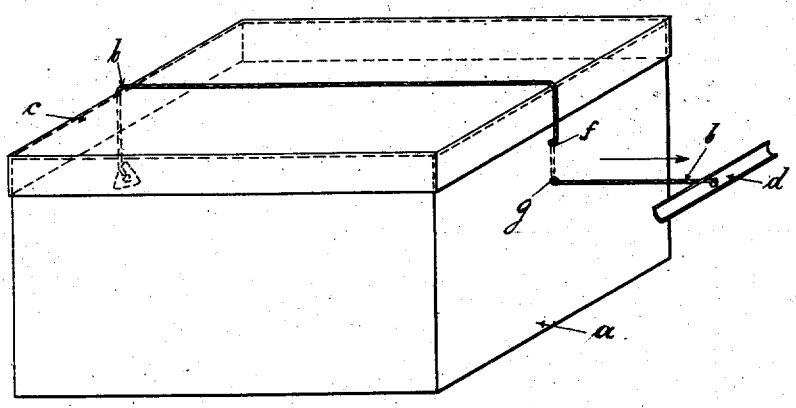

Figure 1 is a perspective view of a packing box provided with the tie shown in a position to keep the cover tightly pressed to the box and the handle ready to be carried by the hand. Fig. 2 is a corresponding perspective view with the handle shown in a position secured against the loosening of the tie. Fig. 3 is a perspective view of the box with the cover removed and the string drawn slack and shifted to the sides of the box for setting the cover free. Fig. 4 is a perspective view of the box, part of the cover and of one side being broken away; this figure illustrates another modification of the arrangement of the string. Fig. 5 is a perspective view of the box showing another modification of the tie, consisting of a string traversing the cover in but a single line.

The same letters of reference indicate the same parts throughout all figures of the drawings.

Referring to Figs. 1, 2, and 3, *a*, is a packing box of any convenient shape and material and *c*, a cover removably placed upon the body *a*, of the box, but the said cover might as well be hinged to the body or secured to it in any suitable manner allowing of its being opened. *b*, is a string, preferably consisting of a packing cord, or of any suitable band, thread or strap. In the modification illustrated in Figs. 1, 2, and 3, the string *b*, consists of one continuous length secured to the body *a*, of the box by passing it through holes *e*, in one side of the box *a*, the portion of the string between the said holes *e*, being placed at the inside of the box. From the said holes *e*, the two branches of the string *b*, are passed upward and traverse the cover *c*, to the opposite edge, from which they pass downward into holes *f*, in the side of the box *a*, opposite to the side, in which the holes *e*, are provided. Other holes *g*, are provided in the side of the box where the holes *f*, are made, and from said holes *g*, the free ends of the branches of the string *b* are passed out, as shown in Figs. 1, 2, and 3. Outside of the box the free ends of the string are connected to a handle *d*, of any suitable kind, shape and material. Said handle *d*, prevents the projecting ends of the string *b*, from being drawn back into the inside of the box. By pulling the handle toward the outside, as indicated by the arrow in Fig. 1, the branches of the string *b*, are tightened across the cover *c*, and the said cover firmly closes the box. It will be easily seen that, by carrying the box by the aid of the handle *d*, the weight of the box and of its contents will by itself exercise the strain which is required for tightening the string and for holding the cover pressed down to the box.

When the box is closed and the string is tightened on, as shown in Fig. 1, the handle *d*, may be secured to the box in a manner to prevent the string from becoming loosened by accident or by the inside pressure of the goods contained in the box, during the time when the box is kept on stock or packed for transmission. A convenient means for securing the handle to the box is illustrated by Fig. 2, it consists in simply shoving the ends of the handle below the branches of the string *b*, immediately above the holes *f*, while the said branches are tightened by strain. While the handle is thus engaged by the branches of the string, the said branches are not liable to become slack and to lose their tightening effect on the cover *c*. At the same time, the handle is prevented from pending down and from entangling itself with other objects. Though the mode of securing the handle, as before described appears to be that of greatest simplicity and convenience, other modes might be employed instead, for instance by securing one or more hooks, buttons or lugs to the cover *c*, or to the box *a*, and corresponding hooks, or buttons or lugs to the handle, then engaging the fastening means of the handle to the corresponding means of the cover or box, thereby clasping the handle to the box in a tight manner.

For opening the box and for removing or lifting the cover *c*, the handle *d*, is, first, disengaged from its secured position indicated by Fig. 2, or from its engagement of any other kind, and the branches of the string *b*, traversing the cover *c*, are pulled in a manner to draw the ends projecting from the holes *g*, to the inside of the box, as far as the handle *d*, will allow. The branches of the string *b*, thereby, will become slack, as shown in Fig. 3, and they are easily shifted off the cover, or lifted from the same to such extent, to permit the cover to be removed or lifted.

The modification illustrated by Fig. 4, consists in securing the string *b*, not only within the holes *e*, of one side of the box *a*, but by passing the same through further holes *h*, in the sides of the box adjacent to the side where the holes *e*, are provided. It will be seen, that, owing to this modification, the string *b*, will traverse the four corners of the cover and, by being tightened, keep the cover down to the box.

The further modification illustrated by Fig. 5, consists in employing a string *b*, one end of which is secured in one side of the box *a*, by means of a knot, or a cross-pin or a shield or other means, thence passing to the opposite side of the box, entering into the hole *f*, and passing out again from the hole *g*, the projecting free end of the string being secured to a handle *d*. The string *b*, in this modification, traverses the cover *c*, in a single line, instead of in two or more lines or branches.

Two or more strings, *b*, may be employed instead of a single string, and said plurality of strings may be secured to the box in the same manner, as shown in Fig. 5 with reference to the single string. The ends of such plurality of strings *b*, may be secured to a common handle, or they may be fastened, each, to a separate handle.

I claim as my invention:

1. The combination with a box provided on opposite sides with orifices, and a cover for the box, of a string secured to the box at one end and threaded through the orifices and having only a frictional engagement with the cover and extending beyond one side of the box to form a handle portion, the extremity of said portion being at a considerable distance from the box to provide slack string whereby that portion of the string overlying the cover may be removed from the same.

2. The combination with a box, of a string permanently secured thereto at one side thereof, a cover engaged only frictionally by a plurality of the branches of the string, the side of the box opposite that in which the string is secured being provided with orifices through which the ends of the string project, the said projecting ends being connected to form a handle at a considerable distance from the box to provide slack string whereby that portion of the string overlying the cover may be removed from the same.

3. The combination with a box, of a string permanently secured to one side thereof and projecting from the other, the other side of the box being provided with orifices to guide the string into the inside of the box and out again, a cover overlaid and frictionally drawn upon by intermediate portions of the length of the string, and a handle secured at a point remote from its extremities to the projecting free ends of the string the handle being a considerable distance from the box to provide slack string whereby that portion of the string overlying the cover may be removed from the same.

4. The combination with a box and a cover therefor, of a string permanently secured to one side of the box, the branches of the string overlying and frictionally engaging the outer surface of the cover and then passing to the inside of the box and out again, and a handle attached at points removed from its extremities to the ends of the string to cause the string to exert tension inwardly upon the cover when the box is lifted and adapted when the string is taut to be disposed under the overlying portion of the string to secure the same against loosening, the handle being a considerable distance from the box to provide slack string whereby that portion of the string overlying the cover may be removed from the same.

5. In a packing box, the combination, with the body of the box, and an independent cover therefor, of a string permanently secured to one side of the body, the branches of the string overlying the outer surface of the cover and then passing to the inside of the box and out again, and handles attached to the ends of the string to cause the string to exert tension downwardly upon the cover when the box is lifted and so arranged as when taut to be caught under the overlying portions of the string to secure against loosening, the handle being a considerable distance from the box to provide slack string whereby that portion of the string overlying the cover may be removed from the same.

In testimony whereof I affix my signature to this specification, in the presence of two witnesses.

ERNST PAUL LEHMANN.

Witnesses:
WOLDEMAR HAUPT,
HENRY HASPER.